United States Patent
Chisholm et al.

(10) Patent No.: US 7,435,073 B2
(45) Date of Patent: Oct. 14, 2008

(54) APPARATUS AND METHOD FOR REFORMING THE NECK FINISH END SURFACE OF A BLOW MOLDED PLASTIC CONTAINER

(75) Inventors: Brian J. Chisholm, Toledo, OH (US); Gregory A. Geisinger, Toledo, OH (US)

(73) Assignee: Graham Packaging Plastic Products, Inc., York, PA (US)

( * ) Notice: Subject to any disclaimer, the term of this patent is extended or adjusted under 35 U.S.C. 154(b) by 791 days.

(21) Appl. No.: 10/916,039

(22) Filed: Aug. 10, 2004

(65) Prior Publication Data

US 2006/0033230 A1     Feb. 16, 2006

(51) Int. Cl.
    *B29C 57/00* (2006.01)
(52) U.S. Cl. ........................ 425/384; 425/392
(58) Field of Classification Search .............. 425/384, 425/392, 297, 525, 806
    See application file for complete search history.

(56) References Cited

U.S. PATENT DOCUMENTS

| 3,418,409 | A | * | 12/1968 | Hesse et al. ................ 264/230 |
|---|---|---|---|---|
| 3,432,586 | A | | 3/1969 | Stenger |
| 3,456,290 | A | | 7/1969 | Ruekberg |
| 3,457,590 | A | | 7/1969 | Dittmann |
| 3,862,698 | A | | 1/1975 | Hafele |
| 4,051,754 | A | | 10/1977 | Harcuba et al. |
| 4,103,411 | A | | 8/1978 | Gottsegen |
| 4,497,622 | A | * | 2/1985 | Grebowiec ................ 425/525 |
| 4,497,758 | A | | 2/1985 | Clark |
| 4,522,770 | A | | 6/1985 | Andersen |
| 4,650,628 | A | | 3/1987 | Evely |
| 4,696,636 | A | | 9/1987 | Evely |
| 4,701,295 | A | | 10/1987 | Kato et al. |
| 4,717,522 | A | | 1/1988 | Evely |
| 4,717,523 | A | | 1/1988 | Evely |
| 4,856,667 | A | * | 8/1989 | Thompson .................. 215/318 |
| 4,954,310 | A | | 9/1990 | Anderson |
| 4,968,242 | A | | 11/1990 | Anderson |
| 5,045,255 | A | | 9/1991 | Kurz |
| 5,215,694 | A | | 6/1993 | Bartimes et al. |
| 5,441,675 | A | * | 8/1995 | Souders ..................... 264/402 |
| 6,062,408 | A | * | 5/2000 | Beck et al. .................. 215/379 |
| 6,434,812 | B1 | | 8/2002 | Andersson et al. |
| 6,530,301 | B1 | | 3/2003 | Seitz et al. |
| 6,555,033 | B2 | | 4/2003 | Cargile et al. |
| 6,629,834 | B2 | | 10/2003 | Cargile et al. |
| 6,675,680 | B1 | | 1/2004 | Seitz et al. |
| 2003/0001316 | A1 | | 1/2003 | Cargile et al. |
| 2003/0064127 | A1 | | 4/2003 | Cargile et al. |
| 2006/0119004 | A1 | * | 6/2006 | Chmura et al. ............. 425/525 |
| 2006/0127618 | A1 | * | 6/2006 | O'Connell et al. .......... 425/384 |

\* cited by examiner

*Primary Examiner*—Robert B Davis
(74) *Attorney, Agent, or Firm*—Knoble, Yoshida & Dunleavy, LLC

(57) ABSTRACT

An apparatus for reforming an annular end sealing surface of a molded plastic container includes a head having an annular contact surface and a drive for bringing the annular contact surface into contact with the annular end sealing surface of the container. The head and the container do not rotate relative to each other during this contact reforming operation. Heat is applied through the contact surface to the end sealing surface while the surfaces are in contact to raise the temperature at the end sealing surface to at least the softening temperature of the plastic material, so that the end sealing surface is softened and reformed by heat and contact with the contact surface.

9 Claims, 2 Drawing Sheets

APPARATUS AND METHOD FOR REFORMING THE NECK FINISH END SURFACE OF A BLOW MOLDED PLASTIC CONTAINER

The present invention relates to blow molded plastic containers, particularly extrusion blow molded plastic containers, and more particularly to reforming the end surface of the container neck finish after trimming.

BACKGROUND AND SUMMARY OF THE INVENTION

Extrusion blow molding plastic containers involves extruding a tube of monolayer or multilayer plastic material, capturing the tube between opposed mold sections, blowing the tube to the contours of the mold cavity, opening the mold, removing the container, and trimming the end of the container neck finish. This trimming operation can involve removal of a dome or moil from the neck finish, which is a convenience element for the blow molding operation and can be recycled as process regrind. In another type of extrusion blow molding operation, the trimming operation can involve separation of two containers that are molded end-to-end. In either event, the trimming operation can leave an uneven end surface for sealing engagement with a container closure. Furthermore, the end surface of the container neck finish may have mold parting line seams that can deleteriously affect sealing engagement with a container closure. An object of the present invention is to provide an apparatus and method for reforming the neck finish end surface after the trimming operation to prepare the end surface for enhanced sealing engagement with a closure.

The present invention involves a number of aspects, which can be implemented separately from or in combination with each other.

In accordance with a first aspect of the invention, an apparatus for reforming an annular end sealing surface of a molded plastic container includes a head having an annular contact surface and a drive for bringing the annular contact surface into contact with the annular end sealing surface of the container. The head and the container do not rotate relative to each other during this contact reforming operation. Heat is applied through the contact surface while the surfaces are in contact to raise the temperature at the end sealing surface to at least the softening temperature of the plastic material, so that the end sealing surface is softened and reformed by heat and contact with the contact surface. In one embodiment, the head contact surface is porous, and the end sealing surface is heated by heated air directed through the porous contact surface. In another embodiment, a heater heats at least the annular contact surface of the head, and the heat is transferred by contact to the end sealing surface of the container.

An apparatus for reforming a neck finish end surface on a blow molded plastic container in accordance with another aspect of the present invention includes a head having an internal annular channel and an annular porous ring closing an end of the channel. At least one air flow passage is provided in the head for delivering heated air to the annular channel and through the porous ring to a container neck finish end engaged with the porous metal ring. The heated air heats both the porous ring and the neck finish end surface to soften the neck finish end surface. The neck finish end surface is reformed both by heat from the air and the porous ring, and by contact with the porous ring. In other words, the container neck finish end surface is heated to softening both by conduction from the porous ring and by contact of the heated air, and is reformed by contact with the ring.

BRIEF DESCRIPTION OF THE DRAWINGS

The invention, together with additional objects, features, advantages and aspects thereof, will be best understood from the following description, the appended claims and the accompanying drawings, in which:

DETAILED DESCRIPTION OF PREFERRED EMBODIMENTS

Figure 1:
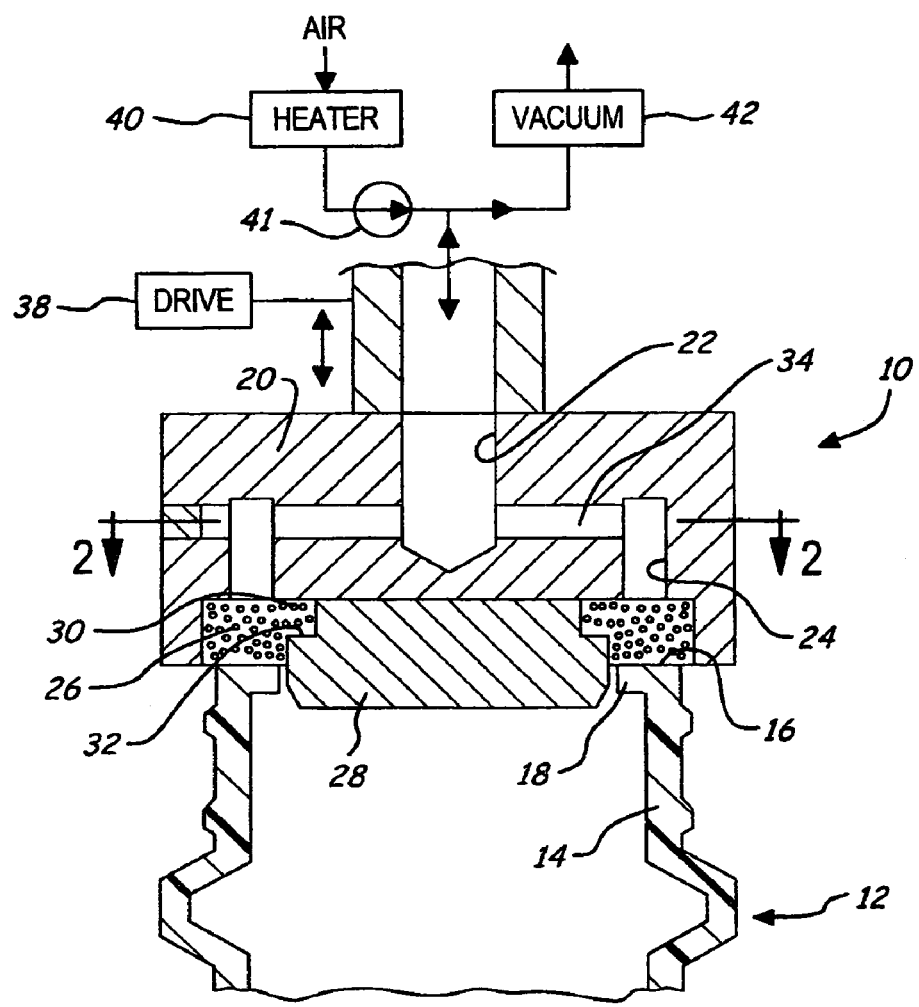
FIG. 1 is a schematic diagram of an apparatus for reforming the end surface of a blow molded plastic container neck finish in accordance with one presently preferred embodiment of the invention.
Figure 2:
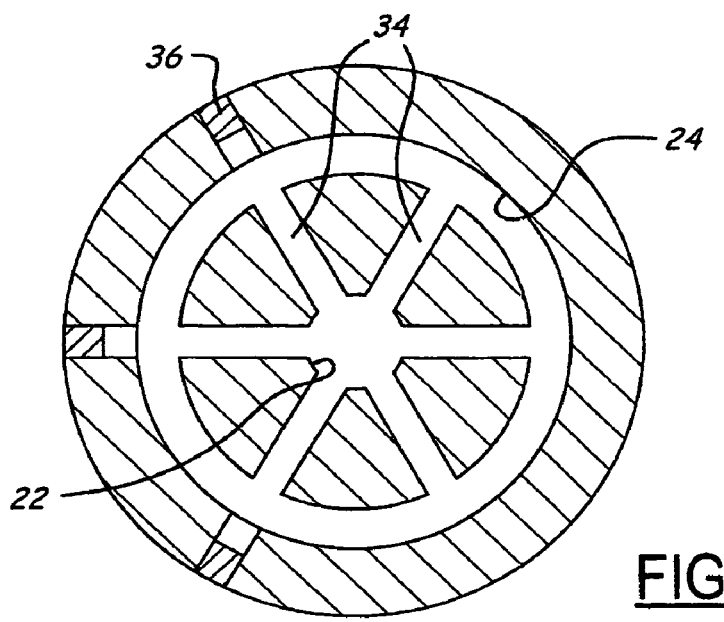
FIG. 2 is a sectional view taken substantially along the line 2-2 in FIG. 1.

FIGS. 1 and 2 illustrate an apparatus 10 for reforming the neck finish end surface of a blow molded plastic container 12 in accordance with one presently preferred embodiment of the invention. Container 12 has a neck finish 14 with an end surface 16 for sealing engagement with a package closure (not shown). In the illustrated embodiment of the invention, neck finish end surface 16 is formed in part by a trim flange 18 that extends radially inwardly from the end of the neck finish, typically at a slight angle to the central axis of neck finish 14. Where neck finish 14 and flange 18 are formed by blow molding, such as in an extrusion blow molding operation, mold parting seams may extend along diametrically opposed sides of flange 18. As an alternative, neck finish 14 can terminate in a trimmed surface 16 without a flange 18.

Apparatus 10 includes a tool head 20 having a central air flow passage 22 and a peripheral air flow passage formed by an annular channel 24 that preferably is coaxial with central air flow passage 22. The lower end of channel 24 (in the orientation of FIG. 1) is closed by an annular porous ring 26, which preferably is of metal construction. Ring 26 may be formed in a suitable sintering operation of metal such as stainless steel, bronze or inconel. Ring 26 has a porosity suitable for free flow of air through the body of the ring, yet has a fine enough surface to provide a sealable container finish. The preferred porosity is within the range of 2 to 20 microns. Ring 26 is held in position by a retainer cap 28, which is suitably secured to the body of head 20. In the illustrated embodiment of the invention, ring 26 is inverted L-shaped in radial cross section, having a radially inwardly extending leg 30 that is captured in assembly by a radially outwardly extending shoulder 32 on retainer cap 28. As best seen in FIG. 2, central air flow passage 22 is interconnected with peripheral channel 24 in head 20 by a plurality of cross-drilled radial passages 34, which are sealed by plugs 36.

One or both of head 20 and container 12 are connected to a suitable drive for moving the head and container relative to each other so as to bring porous metal ring 26 into non-rotating surface contact with neck finish end surface 16. In the preferred embodiment of the invention, head 20 is connected to a drive 38 for moving the head axially into abutting contact engagement with container neck finish end surface 16. For example, a plurality of heads 20 may be mounted around a suitable turret and coupled to cams for bringing the heads into contact engagement with associated containers as the containers travel around the axis of the turret, and with the containers and tools not rotating relative to each other. Central passage 22 of head 20 is connected to a heater 40 and a pump 41 for supplying a flow of hot air through central passage 22 and radial passages 34 to peripheral channel 24 and porous ring 26. This heated air travels through porous ring 26 and impinges upon neck finish end surface 16. The heated air thus not only heats the porous metal ring, but also heats the neck finish end surface to a softening temperature. At the same time, the end contact surface of porous ring 26 is pressed against neck finish end surface 16 so that the neck finish end surface is reformed by heat and contact with head 20.

The porous ring also provides a vent path for any air that would otherwise be trapped between the container finish and the contact surface of the ring. By way of example, containers of polypropylene or polyethylene plastic construction can be heated to a softening temperature of 220-300° F. by hot air at a temperature in excess of 600° F. The temperature of the heated air, the flow time duration and flow rate of the air, the pressure exerted by porous ring 26 onto the container neck finish end surface, and the total time of contact between the porous ring and the neck finish end surface are empirically selected depending upon container plastic composition and other parameters to obtain a smooth neck finish end surface 16 for sealing engagement with a container closure.

FIG. 1 also illustrates provision of a vacuum pump 42 or the like for selectively drawing air in a reverse direction through porous ring 26, channel 24, radial passages 34 and central passage 22 after heater 40 has been turned off Drawing ambient air in this reverse direction helps limit the heating of the container neck finish. As another modification, pump 41 can be activated with heater 40 turned off at the end of the reforming cycle to assist separation of container 12 from chuck 20.

As noted above, porous ring 26 preferably is of metal construction. However, it may be desirable in some applications to limit heating of the porous ring and reduce any tendency of the container end surface to stick to the ring. The ring can be made of non-metal less heat conductive construction.

Figure 3:
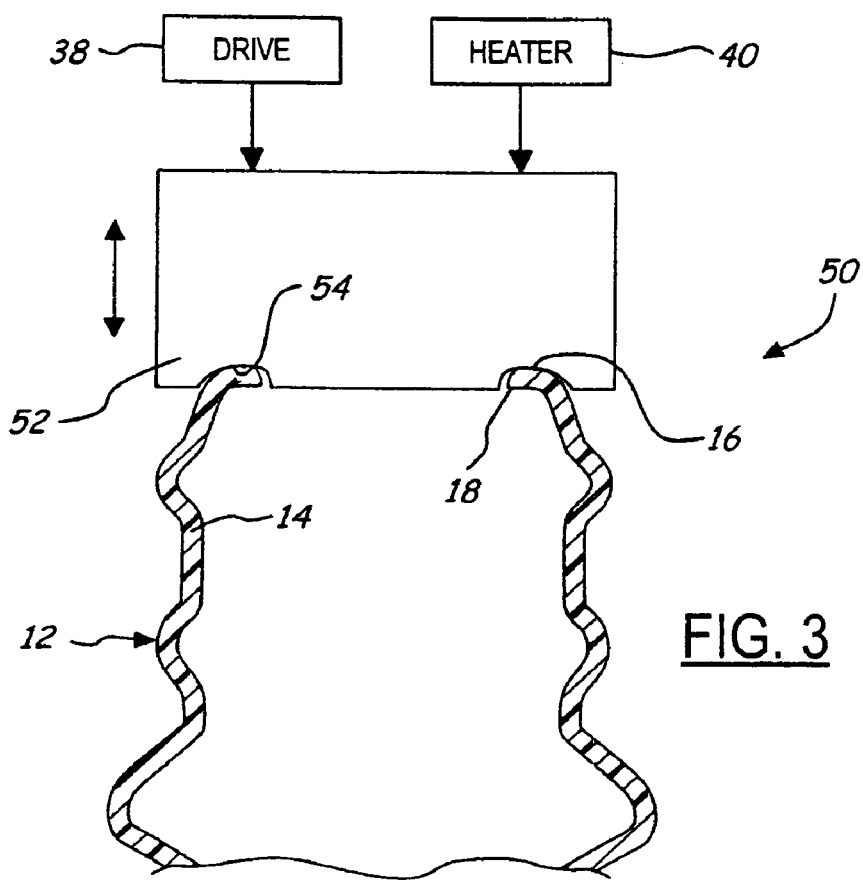
FIG. 3 is a schematic diagram of a container end sealing surface reforming apparatus in accordance with a second embodiment of the invention.
Figure 4:
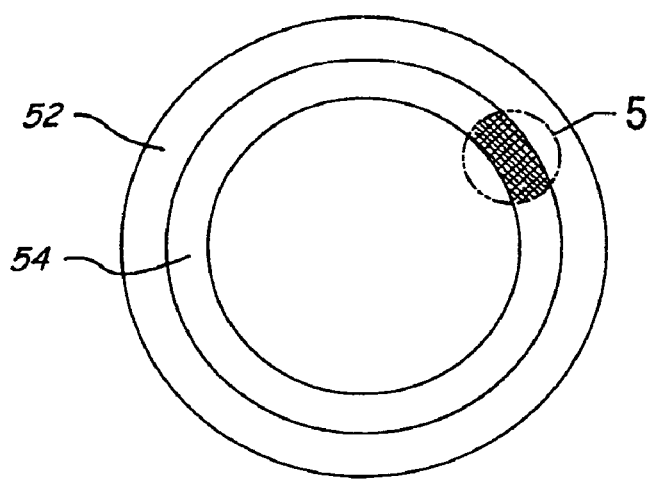
FIG. 4 is an end view of the reforming head in FIG. 3.
Figure 5:
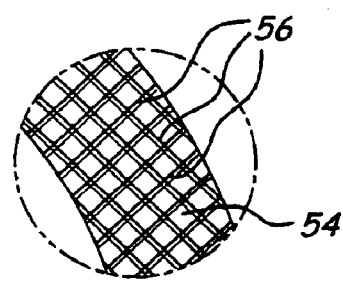
FIG. 5 is a fragmentary view on an enlarged scale of the portion of FIG. 4 within the area 5.

FIGS. 3-5 illustrate a container neck finish end sealing surface reforming apparatus 50 in accordance with a second embodiment of the invention. A reforming tool head 52 has an annular channel 54 that forms a surface for contact with end sealing surface 16. Head 52 is coupled to a drive 38 for non-rotating axial movement against and away from contact with end surface 16. Head 52 is also coupled to heater 40 for heating at least the portion of the head that forms the contact surface. As in the embodiment of FIGS. 1-2, tool 52 and container 12 do not rotate relative to each other during the reforming operation. As best seen in FIG. 5, the annular contact surface of channel 54 is provided with a multiplicity of microscopic grooves or passages 56 to allow escape of air that might otherwise be trapped while head 52 is in contact with the container. Grooves 56 may be formed, for example, by blasting the surface of channel 54 with a fine grit. The microscopic grooves have no effect on the sealing properties of reformed surface 16.

There have thus been disclosed an apparatus and method for reforming a container neck finish end surface that fully satisfy all of the objects and aims previously set forth. The invention has been disclosed in conjunction with two presently preferred embodiments thereof, and a number of additional modifications and variations have been described. Other modifications and variations will readily suggest themselves to persons of ordinary skill in the art. The invention is intended to embrace all such modifications and variations that fall within the spirit and broad scope of the appended claims.

The invention claimed is:

1. Apparatus for reforming an annular end sealing surface of a molded plastic container, which includes: a head having a porous annular contact surface, a drive for bringing said porous annular contact surface into contact with the annular end sealing surface of a container while said head and said container do not rotate with respect to each other, and means for applying heat to the annular sealing surface through said contact surface while said contact surface and the sealing surface are in contact.

2. The apparatus set forth in claim 1 wherein said means includes an air source for directing heated air through the porous surface onto the annular sealing surface.

3. The apparatus set forth in claim 2 wherein said means includes a heater for heating at least said contact surface on said head.

4. Apparatus for reforming an annular end sealing surface of a molded plastic container, which includes: a head having an annular contact surface, a drive for bringing said annular contact surface into contact with the annular end sealing surface of a container while said head and said container do not rotate with respect to each other, and means for applying heat to the annular sealing surface through said contact surface while said contact surface and the sealing surface are in contact;

wherein said annular contact surface is a porous surface, and said means includes an air source for directing heated air through the porous surface onto the annular sealing surface;

wherein said means includes a heater for heating at least said contact surface on said head; and wherein said annular contact surface has a multiplicity of microscopic surface grooves to allow passage of air from between said annular contact surface and the annular end sealing surface of the container.

5. Apparatus for reforming a neck finish end surface on a blow molded plastic container, which includes: a head having an internal annular channel, an annular porous ring closing an end of said channel, and at least one air flow passage in said head for delivering heated air to said channel and through said porous ring to a container neck finish end surface engaged by said porous ring to reform said neck finish end surface by heat from the air and by heat and contact with said porous ring.

6. Apparatus for reforming a neck finish end surface on a blow molded plastic container, which includes: a head having an internal annular channel, an annular porous ring closing an end of said channel, and at least one air flow passage in said head for delivering heated air to said channel and through said porous ring to a container neck finish end surface engaged by said porous ring to reform said neck finish end surface by heat from the air and by heat and contact with said porous ring; and wherein said head includes a central passage for connection to a source of hot air and a plurality of radial passages connecting said central passage to said annular channel.

7. The apparatus set forth in claim 6 including a retainer plug mounting said porous ring on said head over an end of said channel.

8. Apparatus for reforming an end surface of a blow molded plastic container, which includes: a head having an internal annular air flow passage, an annular porous ring adjacent to an end of said head in communication with said annular air flow passage, a drive for moving at least one of said head and said container relative to the other to bring said annular porous ring into contact with the end surface of the container neck finish, and an air source for directing heated air through said air flow passage and said porous ring onto the end surface of the neck finish to heat and soften the neck finish end surface so that the end surface is reformed by contact with the porous ring.

9. Apparatus for reforming an end surface of a blow molded plastic container, which includes: a head having an internal annular air flow passage, an annular porous ring adjacent to an end of said head in communication with said annular air flow passage, a drive for moving at least one of said head and said container relative to the other to bring said annular porous ring into contact with the end surface of the container neck finish, and an air source for directing heated air through said air flow passage and said porous ring onto the end surface of the neck finish to heat and soften the neck finish end surface so that the end surface is reformed by contact with the porous ring; and wherein said air source includes means for selectively drawing air through said porous ring and said air flow passage during contact of said porous ring with the end surface of the container neck finish to prevent overheating of the neck finish end surface.

* * * * *